Figure 3:
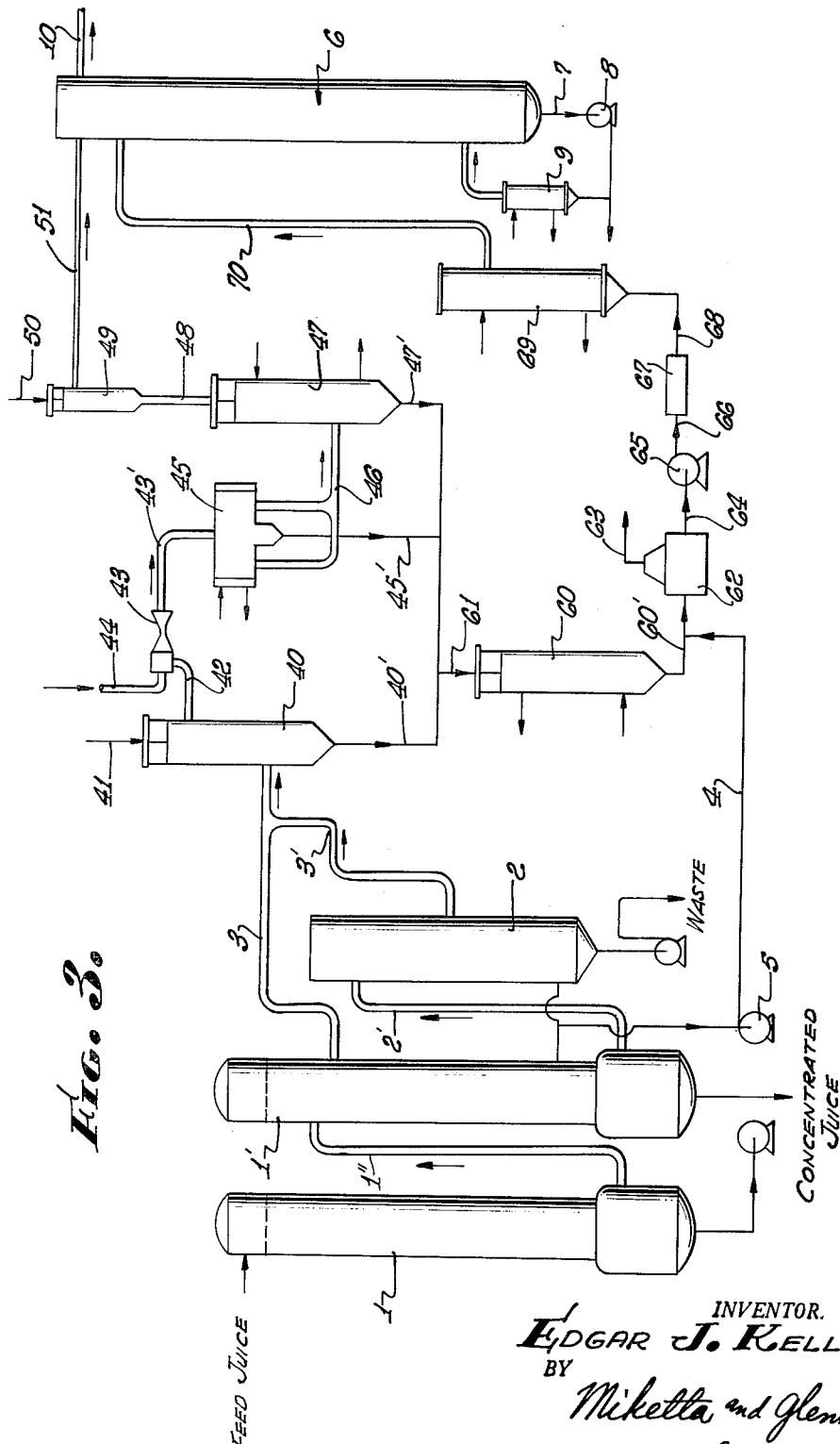

Dec. 14, 1965  E. J. KELLY  3,223,533
METHOD FOR IMPROVING FLAVOR CONSTITUENTS
Filed Dec. 5, 1960  2 Sheets-Sheet 1
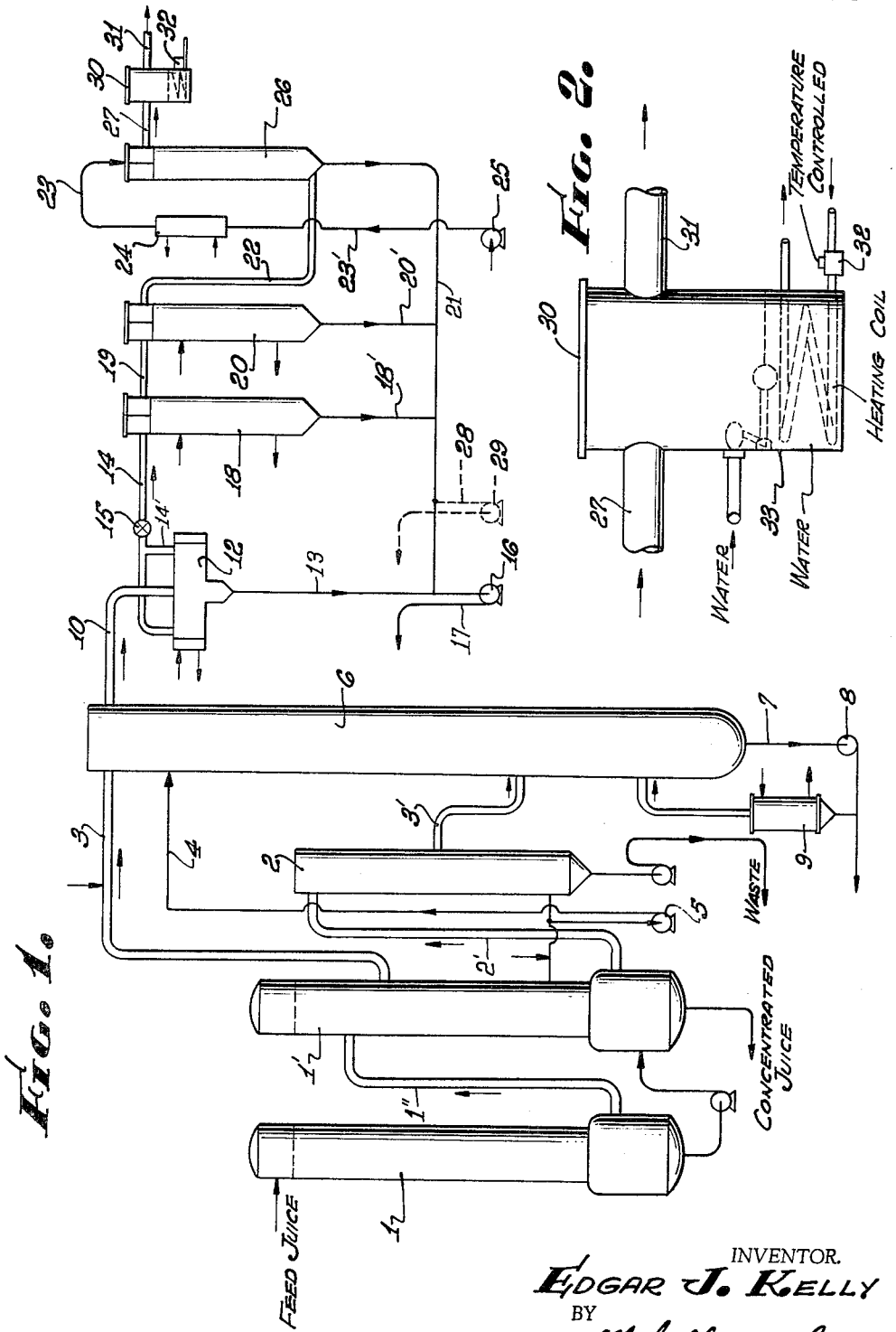
INVENTOR.
EDGAR J. KELLY
BY
Miketta and Glenny
ATTORNEYS.

Dec. 14, 1965  E. J. KELLY  3,223,533
METHOD FOR IMPROVING FLAVOR CONSTITUENTS
Filed Dec. 5, 1960  2 Sheets-Sheet 2

INVENTOR.
Edgar J. Kelly
BY
Miketta and Glenny
ATTORNEYS.

United States Patent Office

3,223,533
Patented Dec. 14, 1965

3,223,533
METHOD FOR IMPROVING FLAVOR
CONSTITUENTS
Edgar J. Kelly, Placentia, Calif., assignor to Libby,
McNeill & Libby, Chicago, Ill., a corporation of Maine
Filed Dec. 5, 1960, Ser. No. 73,742
16 Claims. (Cl. 99—140)

The present invention is directed to a method of separating the characteristic odor and flavor constituents from aqueous source materials generally derived from fruit, berries, beverage materials, such as tea and coffee, etc. The invention is also directed to specific conditions and arrangements of elements for the production of a new concentrate or distillate containing the flavor and aroma constituents in very large proportion or high concentration. The present invention is also directed to both a method and apparatus for removing traces of oily constituents which contaminate the flavor and aroma constituents. This application is a continuation-in-part of application Serial No. 766,902 filed October 13, 1958, now Patent No. 2,992,978, entitled "Method and Apparatus for Producing Flavor Constituents."

For many years it has been recognized that fresh fruit and vegetable juice contained flavoring and aromatic constituents which are extremely characteristic of the particular fruit, plant extract or the like. It has also been recognized that the natural, fresh flavor and aroma of fruit, berries, tea, coffee and other foods are deleteriously affected by the normal concentrating, heating and sterilizing steps, with cooked and off flavors and with a loss of the aroma and flavor which characterizes fresh, mature fruit. Some attempts have been made in the past to recover the relatively volatile flavors and components found in plant products for the purpose of reintroducing them into the final concentrate or canned, cooked or sterilized fruit in order to impart thereto the flavor and aroma of the fresh, natural fruit.

Prior attempts to obtain a fraction in which it was hoped that the flavoring and aromatic constituents would be present in concentrated quantity were not successful and were fallacious in their method of operation. Prior workers in this art appeared to be confused and looked for an oily material as a source of the flavor. The present invention obtains the flavoring and aromatic constituents in a non-oily, water-soluble and miscible form which is virtually colorless, transparent, mobile, burns with a clear blue flame and has a remarkably low freezing point, well below 100° C. and as low as −180° C.

In addition directly contrary to the teaching of the prior art, it has been found that oily contaminants are present with the flavor and aromatic constituents in certain citrus products, which even in extremely small proportions impart unpleasant taste and odor characteristics. Also it has been found that the flavor concentrate itself is a solvent for such oily contaminates so that if the oily contaminants are not removed prior to concentration of the flavor and odor constituents then separation becomes extremely difficult if not impossible.

One of the reasons for the failures of the prior art was the fact that the prior workers did not realize the importance of maintaining conditions of temperature and pressure below 65° C. and 190 mm. of Hg when dealing with fruit juices, citrus juices and other source materials. It has been found that the conditions of operation should be such as to prevent or minimize hydrolysis of the esters and ethers of acetic acid into acids, alcohols and secondary reaction products. It has also been discovered that the esters and ethers of acetic acid constitute important components which impart the characteristic fresh, natural flavor and aroma elements to the concentrate and to the products in which it is subsequently used; colorimetric determination of the ethyl ester of acetic acid (ethyl acetate) content of a concentrate provides a ready mode of evaluation.

Although some prior patentees have referred to what they termed a "100 fold essence" which they allegedly obtained, such term had no true meaning other than the volume of the condensate taken out of the system was 1/100 of the juice fed into the system. For example, Patent No. 2,457,315 speaks of pumping 50 g.p.h. of apple juice into a single stage evaporator, evaporating 10% of such juice, passing the vapors into a fractionating column and condensing the vapors from such column, all at atmospheric pressure. Uncondensed gases were vented from the condenser and the condensate was drawn off at 1/100 of the rate at which fresh juice was fed into the evaporator, this condensate being termed a "100 fold essence." It is evident that in such process the condenser would be fed with vapors composed essentially of water and therefore the condensate would also consist essentially of water since the water will be condensed first. The mole fraction or concentration of the flavor constituents in vapors sent to such prior condenser is far below 0.5% and the vapors would exhibit all of the properties of water vapor. The partial pressure of the volatile constituents at no time approach saturation pressures. At no time would the prior patentees eliminate the water and then condense the more volatile constituents under conditions which effectively utilized partial pressure phenomena and Dalton's law. Dew point conditions (with respect to the flavoring and aromatic constituents) were never reached; the mixtures of air, gases and vapors sent to the condenser contained excessive amounts of water vapor. As a result, the so-called "100 fold essence" was simply a mathematical and volumetric determination and did not actually contain any appreciably increased quantity of flavoring components.

The fallacy of the prior method of identifying the "essence" becomes apparent when one considers that orange juice appears to contain only about 30 p.p.m. of true essence, so that only about 1.5 to 1.6 lbs. of water-free essence can be obtained from 52,000 lbs. of citrus juice. The products made by the method of this invention actually contain one thousand times as much flavoring constituents as the original source material or juice, even in the unpurified, aqueous solution form in which they are normally obtained. Moreover, it is to be remembered that ethyl acetate has a vapor pressure of 760 mm. absolute at about 77° C., whereas water at the same temperature has a vapor pressure of 7 lbs. gauge.

Contrary to prior suggestions that the concentrated or flavor-stripped juice be used as an absorbent or scrubber for the non-condensed gases or vapors prior to venting such residual gases (in an attempt to recover some of the flavoring components from said gases), it has been found that such flavor-stripped juices are not good absorbents; instead, pure water (or dilute, aqueous solutions of ethyl alcohols or sucrose) have been found much more effective. Also contrary to prior practice which was concerned solely with removing water in order to obtain a small volume of liquid to be fractionally distilled, the present invention after initially obtaining a small volume liquid actually adds water to separate the oily contaminants prior to fractional distillation since simple condensation *does not* separate the oily contaminants from the flavor constituents.

Generally stated, therefore, the present invention departs from the prior art and relates to a method of obtaining flavoring constituents from aqueous source materials (such as juice of fresh, natural, deciduous and citrus fruits, berries, aqueous extracts of tea leaves, roasted and ground coffee, etc.) by conducting all of the operations under temperature and pressure conditions which will not cause hydrolysis of esters of acetic acid, the temperatures not exceeding 65° C. and preferably being below 43° C. and absolute pressures not over 190 mm. of Hg and preferably as low as 30 mm. Hg. Any such source material in the form of water vapor and non-condensable gases containing minute quantities of volatile ordor and flavor constituents is subjected to a temperature below about 43° C. and an absolute pressure of not over 115 mm. Hg in a condensation zone to condense not less than 70%, and preferably 80% by weight of water contained in said source material. After the water has been separated from the residual vapors and gases, such vapors and gases are subjected to dew point conditions for flavor and odor constituents and are readily condensed in accordance with Dalton's law. These flavor and odor constituents are obtained in the form of aqueous solutions having the characteristics described hereinbefore containing in excess of 40 grams per liter of such constituents. Ordinarily, the final product contains 30,000 to 60,000 p.p.m. of the volatile flavor-and aroma-imparting constituents, this being a readily handled and utilized product which is not as unstable as the pure essence; more concentrated forms have to be handled at very low temperatures because of their volatile character.

When the source material in the form of a gaseous mixture of water vapor and odor and flavor constituents contains traces of oily contaminants, it is first scrubbed with chilled water. Then it is cooled and scrubbed again with chilled water. The oily contaminants are then removed from the scrub water. The water and scrubbed gaseous mixture are then fractionally distilled to produce the gaseous mixture from which the flavor and odor constituents may be fractionally condensed.

It is an object of the present invention, therefore, to disclose and provide means, methods and conditions whereby concentrated distillates or products containing flavor- and aroma-imparting constituents may be derived from various aqueous media.

A further object of the present invention is to provide means, methods and conditions whereby oil-free flavor and odor constituents may be separated from a gaseous mixture contaminated with oily constituents.

A further object is to disclose and provide a novel concentrated product containing flavor- and aroma-imparting constituents at a concentration in excess of about 30,000 p.p.m. for use in various foods and food products.

Those skilled in the art will readily appreciate various other objects and advantages devised by the use of the modes of operation and conditions hereinafter disclosed in greater detail in connection with the description of an exemplary arrangement of apparatus in which the process may be carried out in the treatment of citrus juices. The appended diagrammatic representation of an arrangement of equipment, FIGS. 1 and 2, is directed to the recovery of an essence composed largely of odor and flavor constituents of the character described hereinbefore. FIG. 3 is a diagrammatic representation of an arrangement of equipment for the recovery of flavor and odor constituents contaminated by traces of oily constituents.

In the exemplary form of apparatus shown in the appending diagram FIG. 1, fresh citrus juice may be introduced into the first of a pair of multiple effect evaporators 1 and 1' and a concentrated juice (from which 15% to about 20% of original water has been removed) is discharged from the second evaporator. Water vapors from the second evaporator may be sent by line 2' to condenser 2 and its condensate is normally sent to waste. Non-condensable gases from 1 are sent to 1' by line 1''; non-condensable gases from 1' and condenser 2 are sent by lines 3 and 3' to a fractionating column 6. Since the condensate from 1' contains some flavor and aroma constituent (this may also be true to a lesser degree as to condensate from 2), the condensate is pumped as by pump 5 and fed by line 4 to column 6. Those skilled in the art will understand that suitable supply of heat, valves, temperature and pressure indicating devices etc. are used and need not be shown in the diagram.

It is highly desirable that the multiple effect evaporators be operated at as low temperature as possible, preferably below 65° C., although somewhat higher temperatures may be employed. It is to be understood that the arrangement of evaporators or other equipment from which the non-condensable gases and extracts or solutions are obtained are not an essential part of this invention; these preliminary units and operations will vary in accordance with the material being treated; if, for example, a coffee essence is to be obtained, no evaporators would be used, but instead, leaching tanks would be employed for the purpose of obtaining an aqueous extract of coffee, such extract being made at a low temperature of below about 65° C. and preferably at a temperature of below about 43° C.

The equipment illustrated in the diagram FIG. 1 and adapted to carry out the process herein disclosed comprises, in addition to the fractionating column 6, a primary overhead type of condenser indicated at 12, a series of saturation component condensers indicated at 18 and 20, a scrubber indicated at 26 and a constant pressure chamber indicated at 30. It is to be understood that additional saturation component condensers may be employed, the diagram being limited to the two, 18 and 20, only for purposes of simplification. The entire system from the fractionating column 6 to the constant pressure chamber 30 is maintained under a substantially uniform vacuum. Uniform and constant vacuum conditions below about 115 mm. Hg are preferably maintained throughout the system and the series of condensing steps are performed at progressively lower temperatures ranging, for example, from 22° C. to 1° C., the last condensing step, for example, being at a temperature between 1° C. to 10° C.; it has been found desirable to maintain pressures as low as 30 mm. Hg in the saturation component condensers 18 and 20 and the scrubber 26. The desired vacuum conditions are attained by connecting the outlet line 31 extending from the constant pressure chamber 30 to a suitable source of vacuum, such as a barometric condenser, suitable pumps, ejectors or the like.

The fractionating column 6 is maintained with a bottom temperature of not over about 55° C., although temperatures as high as 65° C. may be used in some instances. Temperatures at the top of the fractionating column should not exceed 43° C. and are preferably maintained on the order of about 32° C.–33° C. A part of the bottoms discharged from the bottom of the fractionating column 6 as by line 7 and sent to the pump 8 may be recirculated through a reboiler 9 and returned to the fractionating column, as indicated. These bottoms may be discharged by the pump 8 to waste or other disposal.

The vapors from the fractionating column 6 are discharged by line 10 to the condenser 12. The temperature and pressure conditions within the condenser 12 are such as to condense not less than about 70% by weight of water contained in the vapors submitted to such condenser through the line 10. As previously indicated, the virtually constant subatmospheric pressure is maintained throughout the system and such pressure should be below about 155 mm. Hg. In actual practice, pressures of approximately 50 mm. Hg to as low a 30 mm. Hg are employed; under such pressure conditions the temperature within the condenser 12 is maintained at between about 30° C. and 43° C. in order to thoroughly strip the gases of at least 70% of their moisture content.

The condensed water is discharged from the overhead condenser 12 as by line 13 and the uncondensable components, residual vapors and gases, are discharged as by lines 14 and 14' into the first of a series of saturation component condensers such as the condenser 18. A valve 15 is indicated in the line 14 and although normally kept open, may be used to slightly throttle the gases and assure condensation of the required amount of water in the condenser 12.

The condenser 18 is operated at a temperature of, say around 16° C.–18° C., and gases which have not been condensed in the condenser 18 are discharged by line 19 into the condenser 20, which in the example being given, would now operate at a still lower temperature, say, a temperature of approximately 10° C. The odor and flavor constituents which have been condensed in condensers 18 and 20 are discharged therefrom by lines 18′ and 20′, respectively, into a manifold line 21, permitting these odor and flavor constituents to be combined. The uncondensed vapors and gases from condenser 20 are then shown being sent by line 22 to the scrubber 26. This scrubber also operates at the very low pressure of 30 mm. to 50 mm. Hg and spray of scrubbing liquid supplied thereto by line 23 is preferably chilled as by a chiller 24 before introduced into the scrubber. As previously indicated, it is desirable to use clean, pure water as a scrubbing liquid and such water may be supplied to the chiller 24 by means of pump 25 and line 23′. The liquid from the scrubber 26, containing its absorbed and adsorbed odor and flavor constituents, is discharged into the line 21. The still uncondensed and uncondensable vapors or gases from the scrubber are now discharged as by line 27 into the constant pressure chamber 30. FIG. 2 represents an enlargement of constant pressure chamber 30 and shows more details of its construction. This device insures constancy of vacuum throughout the system and contains a body of water in its lower portion, together with a temperature control device indicated at 32 which actuates a valve (or switch) so as to admit either steam or electric current into a heating coil located in such body of water in the event the temperature of the body of water drops below a predetermined point. A float control is also provided (indicated at 33) for the purpose of maintaining a constant level of water in the device. As previously indicated, the outlet pipe 31 leading from the constant pressure chamber is associated with a suitable source of vacuum.

The condensates discharged from condensers 18 and 20 and the scrubber 26 will contain the greatest concentrations of the odor and flavor constituents. For example, when the system is operated on orange juice, the concentrations obtained will range from between about 10,000 p.p.m. to 150,000 p.p.m. The condensate from the primary condenser 12 will also contain some odor and flavor constituents but at a low concentration, say, only 100 to 200 p.p.m. Although the condensates and concentrates from the condensers 18 and 20 and scrubber 26 may be combined in a line 21 and separately withdrawn as indicated by line 28 through a pump 29 and sent to essence tanks, bottling, or the like, it has been found desirable to combine these concentrates with the condensate from the primary condenser 12 because of the relatively large amount of the condensate obtained from condenser 12 in comparison with the relatively small quantities (having high concentration of odor and flavor components) obtained from the condensers 18, 20, etc. FIG. 1 therefore shows line 21 in communication with outlet line 13, all of the concentrates being sent through a pump 16 and then by line 17 to storage.

In the specific embodiment of apparatus shown in FIG. 3, the arrangement of evaporators is the same as that used in FIG. 1. However the non-condensable gases from evaporator 1′ and condenser 2 are sent by lines 3 and 3′ to a scrubber 40 rather than directly to fractionating column 6. Likewise the condensate from evaporator 1′ and condenser 2 is pumped by pump 5 and line 4 to a centrifuge 62 rather than directly to fractionating column 6. Accordingly, the non-condensable gases and the condensate are processed before entering the fractionating column 6 and after entering the fractionating column 6 will exit through line 10 to be further processed in the same manner as the vapors passing through line 10 shown in FIG. 1. The gaseous mixture entering scrubber 40 usually contains about 0.01% oily contaminants and 60% water vapor but may contain over 0.1% oily contaminants. Since the operating pressure of scrubber 40 is preferably maintained at about 10 mm. Hg, Dalton's law indicates that the partial pressure of the oily contaminants is usually about 0.001 mm. Hg assuming a concentration of 0.01%. At such extremely low partial pressures, it can be seen that extremely low temperatures would have to be attained in order to simply condense the oily contaminants. This point is emphasized by the fact that the oily contaminants appear to be somewhat more volatile than water and thus more difficult to condense. Hence scrubber 40 while it does remove a small part of the oily contaminants serves primarily to increase their concentration by removing other components of the gaseous mixture. By charging chilled water at about 35° F. at 41 and removing it at 40′, a large portion of the water vapor and other gaseous components are removed so that the gaseous mixture leaving scrubber 40 through conduit 42 usually contains about 1% oily contaminants and 10% water vapor.

The gaseous mixture is pumped through scrubber 40 and conduit 42 by means of a steam jet pump 43 which is fed super-heated steam by steam line 44. During the pumping operation of the pump 43 the super-heated steam will be mixed with the gaseous mixture. The steam jet pump is used to avoid further contamination of the gas mixture with oil. Also by placing the steam jet pump after scrubber 40, the amount of gas to be pumped is minimized and consequently the amount of water added to the gas mixture in the form of steam is minimized. However, the gaseous mixture leaving the steam jet pump 43 through conduit 43′ at about 40° C. and 30 mm.–50 mm. Hg has oily contaminants in substantially reduced concentration and greatly increased water vapor concentration i.e. it usually has approximately 0.1% oily contaminants and 95% water vapor. Therefore the gaseous mixture is sent through condenser 45 where a large portion of the water vapor is condensed and removed along with other condensable components of the gaseous mixture through conduit 45′. The gaseous mixture leaving condenser 45 through conduit 46 consequently usually contains about 5% oily contaminants and 15% water vapor.

The gaseous mixture is then sent through a scrubber-condenser 47 where it is cooled to about 35° F. by a coolant such as ammonia and scrubbed with water. Because of the relatively high concentration of oily contaminants in the scrubber-condenser 47 e.g. usually about 5% and the absorbing effect of the scrub water, the water leaving scrubber-condenser 47 through conduit 47′ usually contains about 5% oily contaminants. Such result can be understood since the operating pressure of the scrubber condenser is usually about 30 to 50 mm. Hg so the partial pressure of the oily contaminants is at least about 1.5 mm. Hg and hence their dew point can be attained. The gaseous mixture is then sent by conduit 48 from scrubber-condenser 47 to scrubber 49 for a final scrub with chilled water at about 35° F. entering at 50. The scrub water leaves scrubber 49 through conduit 48 to be reused in scrubber-condenser 47. The gaseous mixture leaving scrubber 49 through conduit 51 to feed fractionating column 6 contains no ascertainable oily contaminants but still contains the major portion of the flavor and odor constituents since they are present in such small concentrations throughout the steps for removing the oily contaminants.

The scrub water from scrubber-condenser 47 is combined with the condensate from condenser 45 and the scrub water from scrubber 40 in conduit 61 and sent through cooler 60 to reduce resulting combined liquid temperature to about 35° F. The combined liquid stream leaving cooler 60 contains only about 0.5% oily contaminants so the lower temperature is preferred to facilitate separation. The liquid leaving cooler 60 through conduit 60' is combined with condensate from evaporator 1' and condenser 2 and sent to a centrifuge 62 where about 99.9% of the oily contaminants are removed through conduit 63. The substantially oil-free aqueous solution leaving centrifuge 62 through conduit 64 is pumped by pump 65 through conduit 66 to a filter 67 where the last traces of oily contaminants are removed. Pump 65 must not be oil-lubricated since this would add additional oily contaminants. One type of pump which may be used is a centrifugal pump with a mechanical seal. Filter 67 may be a conventional filter with a filter aid such as diatomaceous earth so long as the effective filter openings are sufficiently smaller than the oil globules in the aqueous solution e.g. filter openings of approximately 1 micron compared to oil globules of approximately 10–100 microns. The aqueous solution leaving filter 67 by conduit 68 is then heated by heater 69 and sent to fractionating column 6 through conduit 70.

The following data may be of interest in indicating the results obtained on orange juice where the fractionating tower 6 was fed with vapors and concentrate containing approximately 30 p.p.m. of the odor and flavor constituents and the entire system was maintained at a subatmospheric pressure of 45 mm. Hg. The concentrate from the condenser 12 maintained at a temperature of 38° C. contained about 100 p.p.m. of the essence and amounted to two gallons per minute; the condensate from condenser 18 (maintained at a temperature of 16° C.) contained 20,000 p.p.m. of the essence but the discharge amounted to only 0.1 g.p.m.; the condensate from condenser 20 (maintained at a temperature of 10° C.) contained 100,000 p.p.m. of essence discharged at the rate of 0.1 g.p.m.; the scrubber 26, maintained at a temperature of only 2° C., accounted for 0.5 g.p.m. containing about 10,000 p.p.m. of essence.

As previously indicated, the temperature and pressure conditions within the entire system and throughout the process are such as to prevent or minimize hydrolysis of the esters and ethers of acetic acid into acids, alcohols and secondary reaction products. A determination of the ethyl acetate content of the concentrate or condensates is the simplest and most effective method of determining the actual presence of the odor and flavor constituents and in evaluating such concentrates and essence. For purposes of the record, the following reagents and methods are employed in making the ethyl acetate determinations:

*Reagents employed (percent designations are weight/volume)*

(1) Hydroxylamine hydrochloride, 13.9% (2 M).
(2) NaOH, 3.5 N.
(3) HCl, 4 N.
(4) $FeCl_3 \cdot 6H_2O$, 10% in 0.1 N HCl.
(5) Ethyl acetate standards; 25, 50, 100, 150 and 300 p.p.m. in distilled water. Weight 1.000 g. of pure ethyl acetate in a sealed container, transfer to 1 liter volumetric flask and dilute with water. Dilute this 1000 p.p.m. solution to prepare standards. Due to the high volatility of ethyl acetate, the transfers and dilutions must be done with a minimum exposure to evaporation.

*Determination*

Transfer 200 ml. of juice to an 800 ml. Kjeldahl flask, add 5 drops of mineral oil, a few glass beads and distill 50 ml. into 40 ml. of water in a 125 ml. Erlenmeyer flask. The distillate is delivered below the surface of the receiving water by means of a glass tube constricted to a 2–3 mm. orifice. The receiving water is kept chilled by means of an ice water bath to minimize escape of the esters. Dilute the distillate to 100 ml.

Pipette 2 ml. of hydroxylamine reagent into a 50 ml. Erlenmeyer flask and add 5.0 ml. of the ester sample (standard solutions or distillates) followed immediately with 2 ml. of the sodium hydroxide reagent.

The hydroxylamine may be added to all flasks of a given assay at one time but the sodium hydroxide must be added as soon as possible after each ester sample. Mix and allow to stand for five minutes and then add 2 ml. of the hydrochloric acid reagent and mix. The individual flasks may be held at this point until all samples and standards of a given assay are also at this stage. Add 2 ml. of the ferric chloride reagent, mix, pour 5 ml. into a Klett tube, and read immediately, using filter 54 in a Klett photoelectric colorimeter which has been set at zero using a blank of 5 ml. of water plus 2 ml. of each of the four reagents.

Rinse Klett tube with a few ml. of colored sample before filling with the next sample. Use the same tube for all color readings. If matched tubes are available, the color may be developed directly in the tube using onehalf as much of sample and reagents. Mix with a flat-tipped glass rod.

Calculate esters as ethyl acetate by comparison with the standards.

The above reagents and method of determination are particularly well adapted for the determination of the odor and flavor constituents in relatively dilute or low concentrations. The content of ethyl acetate in the essence or concentrates is normally obtained by diluting the concentrates to a desirable point, say, within a range of colorimetric determination against samples having a standard of 1000 or 5000 p.p.m.

The essence obtained from the juice of citrus fruits, crushed berries and grapes, purees of deciduous fruits (such as apricots, apples, pears, peaches, etc.) can be used to impart a natural, fresh and characteristic flavor and aroma to food products and confections, ice cream, etc. or reincorporated into the concentrated source material. Orange essence obtained by this process can be added to concentrated orange juice and convert the usual flat, cooked taste of reconstituted beverages made from such concentrates into beverages which cannot be distinguished from natural fresh juice. Citrus essences obtained by the methods herein disclosed are free from the terpene-like odors and flavors which characterize citrus oils. One of the important characteristics of the essences recovered by this process is stability upon storage; this may be due, in part at least, to the fact that hydrolysis and decomposition are minimized at the low temperature and pressure conditions, and to the fact that all of the constituents (including naturally contained stabilizing agents) are present in their usual, natural proportions.

Emphasis is again placed upon the necessity of maintaining low, uniform subatmospheric pressures throughout the system composed of the fractionating tower and condensers and the conjoint use of progressively lower temperatures at such uniform subatmospheric pressure in the series of condensation zones, for example at a pressure below about 120 mm. Hg and at progressively lower temperatures between 21° C. and 2° C. or at a pressure of below about 115 mm. Hg and at progressively lower temperatures between 22° C. and 2° C., in order to obtain an essence containing the exceptionally high content of odor- and flavor-imparting constituents in a form unaltered from that assumed by the constituents in the fresh, natural source material. For best results the maximum temperature of vapors should be below about 55° C. at a pressure of not above 115 mm. Hg absolute. Piping between condensers, scrubbers and fractionating tower should be sufficiently large to avoid any material variation in pressure in the system. The constant pressure device 30 performs the important function of preventing the pressure in the condensers from dropping. For example, when the temperature of the vapors in the top of fractionating column 6 is to be maintained at 38° C., the body of water in 30 is also maintained at 38° C. by control device 32 and the water vapor generated at 30 prevents the barometric condenser, ejector, purge or vacuum pump from dropping the pressure in 12, 18, 20 and 26 below the desired pressure of, say, 50 mm. Hg. It is to be noted that 1 lb. of air can carry about 10 lbs. of water vapor at 38° C. and 50 mm. Hg, but will carry about 24 lbs. of water vapor at the same temperature if the pressure drops to 48 mm. Hg; 1 lb. of air can carry about 4 lbs. of water vapor at 38° C. and 56 mm. Hg. These figures show the necessity of maintaining a uniform pressure, condensing and removing the major proportion of water from the gases and then decreasing the temperature to obtain the benefit of the change in partial pressures and reach the dew point of the flavor and odor constituents. Although 1 lb. of air will carry 10 lbs. of water vapor at 50 mm. Hg and a temperature of 38° C., only 0.2 lb. of water vapor can be carried by 1 lb. of air at 50 mm. Hg and a temperature of 16° C.; at 10° C. and the same pressure, the water vapor capacity of air is down to about 0.14 lb. Applicant therefore utilizes a mode of operation which distinguishes from all prior methods, and is able to obtain condensed essence containing in excess of 30,000 p.p.m. of the desired constituents in commercial installations.

It must also be emphasized that when oily contaminants are present in the gaseous mixture even in extremely low concentrations, they must be removed. Prior practice failed to remove such oily contaminants not only because the result they produced i.e. off-flavored concentrate was not recognized but also their high volatility and low concentration prevented their removal by simple condensation or scrubbing. The present invention by first increasing the concentration of the oily contaminants in the gaseous mixture containing the odor and flavor constituents and then scrubbing the gaseous mixture at a low temperature is able to remove the oily contaminants. The actual equipment necessary to obtain this result can vary considerably from that schematically illustrated. For example, the steam jet pump with its associated condenser is unnecessary where a sufficient vacuum can be maintained by the vacuum pump connected to the outlet line 31 such as when a barometric condenser is used with a relatively high operating temperature. Also the final scrubber is unnecessary where the scrubber-condenser is sufficiently large and the scrubber-condenser itself may be replaced by two pieces of equipment i.e. a scrubber and a condenser. However the combination is more economical and efficient. Of course, if the temperature of the gaseous mixture leaving the first scrubber is sufficient low e.g. approximately 35° F. because of entering at a low temperature and the gaseous mixture goes directly to a second scrubber then condenser becomes unnecessary since its function has already been performed by using the low entering temperature.

The essence of coffee, tea, cacao beans, and other condiments and food products can be obtained by leaching the ground source materials with water at a temperature below about 30° C.–35° C. and then supplying such aqueous infusions to the fractionating tower and its associated system of condensers under the conditions hereinbefore described. Even in the case of coffee, the resulting essence is a colorless, clear, water-miscible, mobile and volatile liquid of extremely low freezing point; a room is filled with the aromatic and stimulating fragrance of freshly percolating coffee when the stopper is removed from a small bottle of such essence. Alkaloids are absent and such coffee essence may be used in making flavorful coffee by addition to any innocuous, suitably colored aqueous solution.

The equipment employed in the performance of the methods herein disclosed can vary greatly from that schematically illustrated. Attention is called to the fact that each of the condensers and chillers is provided with suitable heat exchange devices supplied with cold water, brine or refrigerant under automatic temperature-responsive controls. Those skilled in the art can readily construct the equipment in the light of this invention for any given volume of vapors and non-condensable gases per hour, and evaluate the resulting essence concentrates by the test method herein disclosed.

I claim:

1. In a method of separating and isolating odor and flavor constituents of natural fruit and berries from water vapor and non-condensable gases containing a minute quantity of said constituents the steps of: separating a source material composed of water vapor and non-condensable gases containing a minute quantity of volatile odor and flavor constituents at a temperature below about 43° C. and absolute pressure of not over 115 mm. Hg in a condensation zone to condense not less than 70% by weight of the water contained in said source material thereby increasing the partial pressure of the odor and flavor constituents in residual vapors and gases; separating the condensed water from the residual vapors and gases; passing said residual vapors and gases through a series of condensation zones maintained at virtually equal absolute pressure below about 115 mm. Hg, the temperatures in said zones being maintained at progressively lower levels between about 22° C. and 2° C.; and combining the condensates from said series of condensation zones to obtain a virtually colorless liquid containing said odor and flavor constituents.

2. A method as stated in claim 1, wherein the source of material composed of water vapor and non-condensable gases is derived by low temperature evaporation and concentration of orange juice.

3. A method as stated in claim 1, wherein the source of material composed of water vapor and non-condensable gases is derived by low temperature, fractional distillation of an aqueous liquid obtained by leaching roasted and crushed coffee berries with water at a temperature below 30° C.

4. A method of separating the characteristic odor and flavor constituents of natural fruit and berries in the form of a virtually colorless, water-miscible, liquid having a freezing point below 100° C. from aqueous source materials derived from fruit and berries containing said constituents, comprising: subjecting aqueous source materials and gaseous derivatives thereof containing said constituents to fractionation at a maximum bottom temperature not exceeding 65° C. and a maximum top temperature not exceeding 43° C. and absolute pressure not higher than 190 mm. Hg to preclude the hydrolyzation of ethyl acetate and produce large volumes of water vapor and gaseous constituents; subjecting the water vapor and gaseous constituents to a temperature below 43° C. at a subatmospheric pressure sufficient to condense not less than 70% of the total water contained in said vapors but above dew point conditions of the odor and flavor constituents; separating the condensed water from the gaseous constituents and then subjecting said gaseous constituents to a series of fractional condensation steps in a succession of interconnected condensation zones all at a substantially uniform subatmospheric pressure of below about 120 mm. Hg and at progressively lower temperatures between 21° C. and 2° C., and combining the fractional condensate so obtained, said combined condensates containing odor and flavor constitutents of the original aqueous source materials.

5. A method as stated in claim 4 wherein said series of fractional condensation steps are performed in a succession of condensation zones connected in said series, the last of said zones being connected to a source of vacuum; and inducing sufficient water vapor into the connection between said source of vacuum and last zone to maintain a virtually constant vacuum in said zone.

6. A method as stated in claim 4, wherein the aqueous source materials and gaseous derivatives thereof constitute concentrated orange juice and non-condensable gases from a concentrator.

7. A method as stated in claim 4, wherein the aqueous source material constitutes an aqueous liquid obtained by leaching roasted and crushed coffee berries with water at a temperature of below 30° C.

8. In a method of recovering volatile flavor and odor imparting constituents in liquid form from aqueous media containing said constituents comprising: vaporizing water vapor and non-condensable gases from said aqueous media at a temperature not above 43° C. and an absolute pressure of not over 115 mm. Hg; subjecting said vapors to a sequence of condensing steps in series at a uniform subatmospheric pressure of below 115 mm. Hg at progressively lower temperatures than the temperature in the vaporizing step; applying vacuum of below 115 mm. Hg to the gases discharged from the last of said series of condensing steps; and introducing sufficient water vapor into the gases discharged from the last of said series of condensing steps to maintain said uniform subatmospheric pressure during each of said series of condensing steps.

9. A method as stated in claim 8, wherein not less than about 70% of total water vapor is condensed from said water vapor and gases in the first condensing step of said series, and the last of said condensing steps is at a temperature of between 1° C. and 10° C.

10. A method as stated in claim 8, wherein the last of said series of condensing steps comprises scrubbing the non-condensable gases with cold water at a temperature of between 1° C. and 10° C.

11. In a method of recovering volatile flavor- and odor-imparting constituents in liquid form from an aqueous media containing oily contaminants along with said constituents the steps of; vaporizing water vapor and non-condensable gases from said aqueous media at a temperature not above 43° C. and an absolute pressure of not over 115 mm. Hg; subjecting the gaseous mixture to successive scrubbing steps with added cold water to condense the major portion of the water vapors and all of the oily contaminants without substantially condensing the flavor and odor constituents; removing the oily contaminants from the added scrubbing water; combining the residual gaseous mixture with its flavor and odor constituents with the de-oiled added scrubbing water; vaporizing at least a portion of said mixture; subjecting said vapors to a sequence of condensing steps in series at a uniform subatmospheric pressure of below 115 mm. Hg at progressively lower temperatures than the temperature in the vaporizing step whereby at least 70% of the total water vapor is condensed in the first condensing step of said series; applying vacuum of below 115 mm. Hg to the gaseous discharge from the last of said series of condensing steps; and introducing sufficient water vapor into the gases discharged from the last of said series of condensing steps to maintain said uniform subatmospheric pressure during each of said series of condensing steps.

12. A method of separating the characteristic odor and flavor constituents of natural fruit and berries in the form of a virtually colorless, water-miscible, non-oily liquid having a freezing point below 100° C. from aqueous source materials derived from fruit and berries containing oily contaminants and said constituents comprising: vaporizing water vapor and non-condensable gases to form a gaseous mixture from said aqueous medium at a temperature not above 43° C. and an absolute pressure of not nover 115 mm. Hg; scrubbing the gaseous mixture with added cold water to condense the major portion of the water vapors; cooling and scrubbing said gaseous mixture with added cold water to condense water vapor and all of the oily contaminants without substantially condensing the flavor and odor constituents; combining the added scrubbing water with a portion of the aqueous source materials derived from said fruit and berries to obtain an aqueous mixture and removing the oily contaminants therefrom; subjecting the residual gaseous mixture with its flavor and odor constituents and said aqueous mixture to vacuum distillation by fractionation at a maximum bottom temperature not exceeding 65° C. and a maximum top temperature not exceeding 43° C. and at absolute pressure not higher than 190 mm. Hg to preclude the hydrolyzation of ethyl acetate and produce large volumes of water vapor and gaseous constituents subjecting the water vapor and gaseous constituents to a temperature below 43° C. at a subatmospheric pressure sufficient to condense not less than 70% of the total water contained in said vapors but above dew point conditions of the odor and flavor constituents; separating the condensed water from the gaseous constituents and then subjecting said gaseous constituents to a series of fractional condensation steps in a series of interconnected condensation zones all at a substantially uniform subatmospheric pressure of below 120 mm. Hg and at progressively lower temperatures between 21° C. and 2° C., and combining the fractional condensates so obtained, said combined condensates containing in excess of 40 grams per liter of a transparent and virtually colorless, non-oily liquid composed of characteristic odor and flavor constituents of the original aqueous source material.

13. A method for separating oily vapor contaminates from a gaseous mixture containing water vapor and flavor and odor constituents and less than 1% of such oily contaminants whereby the deleterious effect of said oily contaminants on said flavor and odor constituents is avoided comprising: subjecting the gaseous mixture to successive scrubbing steps with added cold water to condense the major portion of the water vapors and all of the oily contaminants without substantially condensing the flavor and odor constituents; removing the oily contaminants from said added scrubbing water; and combining the residual gaseous mixture with its flavor and odor constituents with the de-oiled added scrubbing water.

14. A method as stated in claim 13 wherein said successive scrubbing steps comprise scrubbing said gaseous mixture with added cold water and then cooling and scrubbing said gaseous mixture with additional cold water.

15. A method for pre-treating an aqueous feed material containing volatile flavor and odor constituents and also less than 0.1% unstable oily components which tend to impair the quality of the flavor and odor constituents to remove substantially all of such unstable oily components without damage to the flavor and odor constituents comprising: vaporizing water vapor and non-condensable gases from said aqueous feed material at a temperature not above 65° C. and an absolute pressure of not over 115 mm. Hg; condensing a major portion of the water vapor from said gaseous mixture; scrubbing said gaseous mixture with added cold water; pumping and mixing said gaseous mixture with super-heated steam; condensing a major portion of water vapor from said gaseous mixture; cooling and scrubbing said gaseous mixture with added cold water; combining the liquid condensate and added scrubbing water and removing the oily contaminants from said combined liquid mixture; and combining the residual gaseous mixture containing said flavor and odor constituents with the de-oiled liquid mixture.

16. A method as stated in claim 15 wherein said oil removal step includes cooling the oily aqueous liquid mixture, centrifuging said mixture; removing the aqueous portion of said mixture; filtering said aqueous portion and heating said aqueous portion prior to combining with the residual gaseous mixture with its flavor and odor constituents.

(References on following page)

References Cited by the Examiner

UNITED STATES PATENTS

| | | | |
|---|---|---|---|
| 2,406,375 | 8/1946 | Hoyte | 202—161 |
| 2,457,315 | 12/1948 | Milleville | 99—205 |
| 2,513,813 | 7/1950 | Milleville | 99—205 |
| 2,625,505 | 1/1953 | Cross | 99—205 X |
| 2,641,550 | 6/1953 | Dykstra | 99—205 |
| 2,680,687 | 6/1954 | Lemmonier | 99—71 |
| 2,680,708 | 6/1954 | Cook | 202—186 |
| 2,729,564 | 1/1956 | Keller | 99—205 X |

OTHER REFERENCES

Morgan et al.: Food Technology, 1953, vol. 7, No. 8, pp. 332–336.

A. LOUIS MONACELL, *Primary Examiner.*

ABRAHAM H. WINKELSTEIN, *Examiner.*